United States Patent Office 2,898,370
Patented Aug. 4, 1959

2,898,370

SURFACE-ACTIVE SULFONATED PRODUCT

Albert I. Rachlin, Hackensack, N.J., assignor to Allied Chemical Corporation, a corporation of New York No Drawing. Application December 4, 1957
Serial No. 700,539

9 Claims. (Cl. 260—505)

This invention relates to a process for the production of surface-active sulfonated products of the higher alkylbenzene sulfonate type which in the sodium salt form contain less than 1% by weight of salts insoluble in 90% ethyl alcohol, and to surface-active sulfonated products obtained thereby. It relates more particularly to improvements in the production of surface-active sulfonated products of said type from a reacted mixture resulting from the reaction of a sulfuric acid sulfonating agent with a higher alkylbenzene or mixture containing higher alkylbenzenes.

It is known to produce surface-active agents by reacting sulfuric acid sulfonating agents with higher alkylbenzenes. The sulfuric acid sulfonating agents employed include strong sulfuric acid (especially about 100% sulfuric acid), oleum and mixtures thereof. As ordinarily practiced in commercial operation, the sulfuric acid sulfonating agents are employed in at least sufficient amounts to convert the higher alkylbenzenes to their sulfonic acids (usually the monosulfonic acid). Owing to the fact that water is a by-product of the sulfonation reaction and dilutes the sulfonating agent, the reacted sulfonation mixture, at the completion of the sulfonation, ordinarily contains a considerable amount of sulfuric acid. When the resulting reacted mixture is treated with a suitable salt-forming agent, for example alkali metal hydroxide or alkali metal carbonate, for the purpose of forming the corresponding salt of the higher alkylbenzene sulfonate, the spent sulfuric acid present in the reacted sulfonation mixture is converted to the corresponding sulfate.

While, for ordinary use, the presence of inorganic sulfate in the final sulfonate product is desirable, for certain purposes the presence of inorganic sulfate in the surface-active sulfonate product is a distinct disadvantage and in some cases may be harmful. For example, when the higher alkylbenzene sodium sulfonate products are mixed with soap and pressed into bars, the presence of even as little as 10% of inorganic salts, chiefly sodium sulfate, in the sulfonate products gives rise to bars which become "frosty" (due to surface crystallization of sodium sulfate after use); further, the presence of the inorganic salts prevents the preparation of highly concentrated aqueous solutions (stock solutions) owing to the "salting-out" effect of the inorganic salts on the organic sulfonates, promotes corrosion of steel tanks and equipment by aqueous solutions of the products, causes dyestuffs to "jump" onto the fiber, when the products are used as wetting assistants in the dyebath, thus producing uneven dyeings, and promotes "breaking" of emulsions, thus opposing the emulsifying action of the higher alkylbenzene sodium sulfonates.

It has been proposed to separate inorganic salts from dry final sulfonation products (obtained by neutralizing a sulfuric acid-containing reacted sulfonation mixture with sodium hydroxide or other salt-forming reagent and drying) by dissolving the organic sulfonate in ethyl alcohol or other suitable solvent in which inorganic sulfates and other inorganic salts are insoluble, separating the solution from the insoluble inorganic salts; and recovering the organic sulfonate from the solution; or by extracting the organic sulfonate from an aqueous solution of the final surface-active sulfonate product in the salt form by means of ethyl or isopropyl alcohol, whereby an alcoholic solution of the organic sulfonate is obtained which is immiscible with the remaining aqueous solution of the inorganic sulfates, separating the two solutions, and recovering the organic sulfonate from the alcoholic solution. These procedures are subject to one or more disadvantages; such as, incomplete removal of the inorganic sulfates, excessive loss of valuable organic sulfonates, filtration difficulties, repeated handling of solutions, and emulsification difficulties arising from the fact that the organic sulfonates in aqueous solution are emulsifying agents for the extracting agents.

It has also been proposed to remove the sulfuric acid from the reacted sulfonation mixtures in various ways, prior to neutralization, so as to avoid forming inorganic sulfates. One method commonly employed is to dilute the reacted sulfonation mixture to a limited extent with water (or ice) and permit the diluted mixture to stand, whereby two layers are formed—one being dilute sulfuric acid and the other being organic sulfonic acid—and then separate the layers. This procedure has the disadvantage that complete separation is not obtained; owing to the fact that a substantial amount of the dilute sulfuric acid dissolves in the organic sulfonic acid layer, resulting in the presence of a substantial amount of inorganic sulfate in the final product, and that a substantial amount of organic sulfonic acid dissolves in the dilute sulfuric acid layer, resulting in losses of sulfonated organic compound unless additional recovery procedures are employed.

Another procedure heretofore proposed involves reacting lime or other suitable calcium compound with the reacted sulfonation mixture, whereby the residual sulfuric acid is converted to insoluble calcium sulfate while the organic sulfonic acids are converted to water-soluble calcium sulfonates, separating the insoluble calcium sulfate from the remaining solution of calcium sulfonates, and recovering the organic sulfonates from the latter (for example, by treating the solution of the calcium sulfonates with sodium carbonate, separating the insoluble calcium carbonate from the remaining solution of sodium sulfonates, and evaporating the sodium sulfonates to dryness). This procedure has the disadvantages that it requires repeated handling and filtration of solutions, and results in losses of the valuable surface-active sulfonates.

Another known procedure involves washing the reacted sulfonation mixture with aqueous sodium sulfate, whereby sulfuric acid is extracted. This procedure is also subject to the disadvantage that only a partial separation of the sulfuric acid is obtained thereby.

The present invention involves a procedure whereby undesired sulfuric acid present in a higher alkylbenzene sulfonic acid, such as a reacted sulfonation mixture of the type referred to above, is converted to another organic sulfonic acid which is compatible with the higher alkylbenzene sulfonic acid, while still present in the higher alkylbenzene sulfonic acid, instead of being removed therefrom or being later removed as inorganic sulfate.

In the practice of the present invention, the sulfuric acid contained in the higher alkylbenzene sulfonic acid is converted to an organic sulfonate by reacting it with a sulfonatable organic compound boiling below 150° C. at atmospheric pressure and selected from the group consisting of alkylbenzenes and monohalogenated benzenes. In order to assure substantially complete reaction of the sulfuric acid with the sulfonatable organic compound, water present in the mixture in the form of aqueous sulfuric acid and/or water formed during the reaction is removed by joint vaporization with the sulfonatable organic compound. As a result, the final sulfonation product comprises a mixture of the principal, surface-active higher alkylbenzene sulfonic acid and a sulfonic acid of said sulfonatable organic compound (which may or may not itself be surface-active), and is substantially free from sulfuric acid. When the resulting mixture of sulfonic acids is neutralized or otherwise treated to convert them to their sodium or other salts (for example, by neutralization with sodium hydroxide or other alkaline oxide or hydroxide or carbonate, or by reaction with an organic base) and evaporated to dryness, the resulting mixture of sulfonates is substantially free from salts of sulfuric acid (inorganic sulfates and other sulfate salts). As employed herein, the expression "substantially free from salts of sulfuric acid" refers to a total content of inorganic sulfates and other salts of sulfuric acid not exceeding 0.5% by weight of the sulfonate product, as evidenced by the percent by weight of material insoluble in 90% alcohol (2B denatured ethyl alcohol) found to be present in the salt mixture when tested in the form of the sodium salts in the following manner:

A one-gram sample of the product to be tested is added to 10 ccs. of distilled water. The agitated mixture is warmed gently to obtain a complete solution, and 100 ccs. of anhydrous ethyl alcohol (2B denatured) are then added. The resulting mixture is allowed to stand for 15 to 30 minutes and is then filtered through a tared, ignited Gooch crucible. Any precipitate which has formed, and is thus retained as filter-cake in the crucible, is washed with about 100 ccs. of the anhydrous alcohol. The crucible is then dried at 105° to 135° C. for 15 minutes, ignited at 600° to 700° C. for 30 minutes, cooled, and weighed.

The sulfuric acid-containing higher alkylbenzene sulfonic acid can be subjected to the treatment in the form obtained directly by the reaction of the sulfonating agent with the higher alyklbenzene. In the interest of economy, or where too high a content of additional organic sulfonate in the final higher alkylbenze sulfonate product is not desired, however, the sulfuric acid content can be reduced in any desired manner (a number of which are known, as set out above) prior to subjecting the sulfuric acid-containing sulfonic acid to the treatment in accordance with the present invention.

Sulfonatable organic compounds boiling below 150° C. at atmospheric pressure which are useful in accordance with the present invention include various alkylbenzenes and monohalogenated benzenes having said boiling characteristics. Such compounds react with sulfuric acid at temperatures below 150° C. to form sulfonic acids compatible with the higher alkylbenzene sulfonic acids in the uses for which the latter are employed, and their vapors form mixtures with water vapor at the desired low temperatures. Thus, they are effective for converting the residual sulfuric acid to compatible sulfonic acids and, by their action in removing from the reaction mixture water present as dilute sulfuric acid or formed by the sulfonation reaction, by joint vaporization with the water, they concentrate the sulfuric acid to a sulfonating strength. Examples of such compounds are toluene, the various xylenes and mixtures thereof, ethylbenzene, and monochlorobenzene. The methylbenzenes, and especially toluene, are of particular value in this connection, inasmuch as they are readily sulfonatable and form vapor mixtures with water vapor at vaporizing temperatures which are also advantageous sulfonation temperatures.

The sulfonatable organic compounds are preferably employed in considerable excess of the amount necessary for complete reaction with all of the sulfuric acid and for vaporization of all of the water present and formed in the course of the reaction between said sulfonatable organic compound and the sulfuric acid.

An advantageous method for carrying out this procedure is to heat the sulfuric acid-containing higher alkylbenzene sulfonic acid and the sulfonatable organic compound to boiling, condense the vapors of water and sulfonatable organic compound given off during the course of the heating and resulting reaction, separate the water from the condensate, and return the sulfonatable organic compound to the reaction mixture.

Upon completion of the conversion of the sulfuric acid to organic sulfonate, and remainder of the sulfonatable organic compound present in the resulting mixture of sulfonic acids may be removed in any suitable manner (for example, by distillation, stratification, etc.), and the mixture of organic sulfonic acids may then be neutralized with sodium hydroxide, or treated in any other desired manner, for the production of sulfonates having a low content of sulfate salts.

For purposes of illustration the invention will be further described, in the specific examples set out below, in connection with a sulfonation product obtained by sulfonating a higher alkylbenzene mixture, derived from kerosene, in the following manner. The parts are by weight and temperatures are in degrees centigrade.

Part A.—A Pennsylvania petroleum distillate (kerosene), which had a specific gravity of 0.790 at 24° and distilled from about 180° to about 300°, 80% thereof distilling over the range of 200° to 280°, and which was composed substantially of a mixture of saturated, open-chain and cyclic hydrocarbons, was chlorinated at about 72° to 74° by introduction of a stream of gaseous chlorine until the specific gravity of the charge had increased to 0.918 at 24°. 7000 parts of the chlorinated kerosene mixture were then added to a mixture of 14,600 parts of benzene and 370 parts of aluminum chloride at the rate of 750 parts every 10 minutes, the temperature of the mass being allowed to rise after addition of one-half of the kerosene chloride charge so as to bring it to 45° by the end of the addition. When the addition of kerosene chloride was complete, the reaction mass was further agitated at 45° for about 15 minutes, and then allowed to settle for about 1 hour, after which the upper oily layer of crude chlorkerosene-benzene condensation product (crude "kerylbenzene") was decanted from the lower layer of tarry material. Unreacted benzene and other low-boiling material were distilled from the decanted oil by passing the oil in form of a stream of large surface relative to its volume through a heated tubular vaporizer under atmospheric pressure, wherein it was rapidly heated to a temperature of 140°, in the manner of U.S.P. 2,441,351. The resulting oil was treated with 37 parts of flaked caustic soda, and then distilled in vacuo (3 to 4 inches of mercury absolute pressure) until the aniline point of the distillate rose to 61°. The residual material in the still was then further distilled in vacuo, and the distillate was collected separately until the boiling point of the distilland reached 240° at 3 to 7 mm. of mercury absolute pressure. The kerylbenzene thus collected as a separate distillate, which amounted to 4400 parts, was refined by mixing it with 810 parts of 100% $H_2SO_4$, agitating the mixture for about 30 minutes at about 40°, allowing the mixture to stand for about 30 minutes to permit separation into layers, and drawing off the lower layer of spent acid and impurities. The upper layer of refined kerylbenzene was then sulfonated by mixing it with 5720 parts of 100% sulfuric acid, and heating the mixture at 55° to 60° for about 30 minutes.

Part B.—Spent sulfuric acid was partly removed from the resulting crude sulfonation mass by diluting it with water added in the form of 880 parts of ice, agitating for 15 minutes, allowing the diluted mass to stand for 2 hours (during which time it separated into two distinct layers), and drawing off the lower layer, consisting chiefly of spent sulfuric acid. The resulting sulfonation product was largely kerylbenzene sulfonic acid, but it contained a considerable amount of residual sulfuric acid. Thus, when a sample thereof was treated with sufficient aqueous sodium hydroxide to render it neutral to Nitrazine Yellow paper, evaporated to dryness, and extracted with 90% alcohol in the above manner, approximately 10% by weight of the sample was insoluble in the alcohol (being mainly sodium sulfate).

For purposes of converting the sulfonation product to a product substantially free from residual sulfuric acid, and which when neutralized with sodium hydroxide formed a sulfonate product substantially completely soluble in 90% alcohol (containing less than 1% by weight of salts insoluble in 90% alcohol), the sulfuric acid-containing sulfonation product was treated in the manner described in the following examples, in which parts are by weight and temperatures are in degrees centigrade.

*Example 1*

260 parts of toluene were added to 141 parts of the sulfuric acid-containing sulfonation product of Part B above (corresponding to 100 parts of the distilled kerylbenzene). The resulting mixture was heated and refluxed in a still provided with means for continuously collecting the reflux condensate of toluene and water, separating the water from the toluene, and returning the toluene to the boiling mixture in the still; for example, apparatus of the type shown in Figure 1, A of Industrial and Engineering Chemistry, vol. 15, Analytical Section (1943), page 518. The mass was refluxed until water no longer appeared in the condensate (about 3 hours), indicating completion of the conversion of the residual sulfuric acid to toluene sulfonic acid. The temperature rose from about 105° to about 110°; about 5.5 parts of water were collected. The remaining toluene was then removed by vacuum distillation (at a pressure of 30 to 40 mm. of mercury absolute). The still contents, which now amounted to about 135 parts, were diluted with 200 parts of water and then rendered neutral (grass green) to Nitrazine Yellow paper with 25% aqueous sodium hydroxide, and the neutralized mass was drum-dried. The product thus obtained was in the form of yellowish-white, friable flakes, consisting essentially of a mixture of about 85% sodium kerylbenzne sulfonate and about 15% sodium toluene sulfonate, by weight. It contained only 0.12% by weight of inorganic salt, as determined by the above test with 90% alcohol.

*Example 2*

Instead of the toluene employed in Example 1, 215 parts of xylene (technical ortho-xylene) were employed in the process of Example 1. Owing, however, to the greater ease of sulfonation of xylene than of toluene, the residual sulfuric acid present in the starting material was substantially completely removed, by transformation to xylene sulfonate, in 1 to 2 hours. But, the higher boiling point of xylene, and consequent higher reaction temperature, caused somewhat greater formation of colored impurities; the neutralized sulfonation product obtained in accordance with this example gave somewhat darker solutions in water than the neutralized product of Example 1.

*Example 3*

Solvent naphtha (a coal-tar distillate consisting largely of isomeric xylenes) was substituted in about equal amount for the xylene employed in Example 2. The neutralized product thus obtained was similar to that of Example 2.

*Example 4*

A mixture of 129 parts of toluene and 100 parts of xylene (or a similar mixture of toluene and solvent naphtha) was substituted for the xylene employed in Example 2. The resulting neutralized product gave solutions in water which were lighter in color than those of the neutralized product of Example 2, but somewhat darker than those of the neutralized product of Example 1.

*Example 5*

The crude sulfonation product of Part A, above, was treated in a manner similar to that described in Example 1. (The crude sulfonation product contained spent sulfuric acid in such amount that, when a sample of it was neutralized with sodium hydroxide and dried, the resulting dried product contained approximately 40% by weight of inorganic salt, mostly sodium sulfate, as determined by the above test with 90% alcohol.) Thus, 260 parts of toluene were mixed with 238 parts of the crude sulfonation product and refluxed in the manner described in Example 1. A period of 12 hours was required until water no longer separated from the reflux condensate (36 parts of water being separated from the condensate during this operation). The remaining toluene was then removed by vacuum distillation. The drum-dried neutralized product obtained on further treatment in the manner of Example 1 contained approximately 1% by weight of alcohol-insoluble material (inorganic salt). It contained a much higher proportion of sodium toluene sulfonate than the product of Example 1.

*Example 6*

1080 parts of toluene were stirred into 656 parts of a sulfuric acid-containing sulfonation product which was obtained essentially in the manner described in Part B above. The resulting mixture was stratified for a half hour at room temperature (no rise in temperature during mixing and stratification was noticed), and a lower layer of spent acid (amounting to 30 parts) was withdrawn. The mass was then heated to refluxing under atmospheric pressure for 8 hours while continuously removing water from the condensate and returning the toluene to the still, during which 16 parts of water were removed. The mass was charged to a distillation flask and stripped of toluene under reduced pressure (20 mm. Hg) and the resulting sulfonation mass (619 parts) was neutralized with aqueous caustic soda and drum dried.

The aniline point, mentioned above, refers to a determination made as follows: A convenient volume (e.g., 5 ccs.) of the material to be tested is mixed with an equal volume of freshly-distilled aniline in a dry test-tube. If necessary, the mixture is warmed to obtain a clear homogeneous solution. While the solution is stirred with a thermometer, it is cooled slowly and the temperature is noted at which the solution becomes so opaque, due to the development of turbidity, that the bulb of the thermometer is no longer clearly visible. This temperature is known as the aniline point.

It will be realized by those skilled in the art that the invention is not limited to the details of the foregoing examples and that changes can be made without departing from the scope of the invention.

Thus, the invention is not limited to the treatment of sulfuric acid-containing mixtures resulting from the sulfonation of kerylbenzene, but may be similarly employed in the treatment of mixtures resulting from the sulfonation of other higher alkylbenzenes and mixtures thereof; for example, alkylbenzene sulfonic acids having a total of at least 8 carbon atoms in one or more alkyl groups.

The alkylbenzenes may have been obtained as such or may have been produced (e.g., by condensation with benzene) from halogenated hydrocarbon mixtures of the type of petroleum distillate mixtures (such as, a kerosene or "white oil" fraction of petroleum, or a Fischer-Tropsch reaction product); or from related unsaturated hydrocarbon mixtures (such as, polymerized olefins, or olefins from cracking processes); or from higher alcohols (such as, lauryl alcohol, cetyl alcohol, mixtures of alcohols derived by hydrogenation from cocoanut oil), or from acylchlorides (by formation of alkylbenzene ketones which are then reduced).

The process of the present invention is particularly suited for use with mixtures of higher alkylbenzene sulfonic acids wherein the respective alkyl groups are derived from a non-benzenoid hydrocarbon, or mixture of such hydrocarbons, and especially from petroleum distillates which are predominantly mixtures of aliphatic hydrocarbons boiling for the most part above 100° C., and particularly within the range 180° to 300° C. at ordinary pressure, and are directly attached to the benzene nucleus. Alkylbenzene sulfonates of this type are excellent detergents, wetting, and emulsifying agents. They disclosed in United States Patents 2,195,409; 2,283,199; 2,314,255; 2,314,929 and 2,340,654, among others.

The sulfuric acid-containing sulfonic acids which may be treated in accordance with the present invention include those in which oleum or mixtures of oleum and sulfuric acid have been employed as sulfonating agents, as well as those in which sulfuric acid has been employed as sulfonating agent.

The treatment in accordance with the present invention may be applied to sulfuric acid-containing sulfonic acids whose sulfuric acid content has been preliminarily reduced by another treatment (which may or may not be one of those previously known), as in the case of Examples 1 to 4 and 6, above, or it may be applied to mixtures resulting from the sulfonation reaction, without first removing a part of the sulfuric acid contained therein (as in Example 5). When the reacted sulfonation mixture contains a relatively large amount of sulfuric acid (e.g. 40% or more by weight), preferably a part of the sulfuric acid is removed (so as to leave not more than about 15% by weight) prior to the treatment in accordance with the present invention; e.g., by controlled dilution with water and separation of the resulting dilute sulfuric acid from the remaining reacted sulfonation mixture, or in any other desired manner.

I claim:

1. In the process of producing a surface-active sulfonated product of the higher alkylbenzene sulfonate type by sulfonating a higher alkylbenzene with an excess of a sulfuric acid sulfonating agent, thereby forming a reacted sulfonation mixture containing a sulfonated higher alkylbenzene and sulfuric acid, the improvement which comprises reacting a sulfonatable organic compound boiling below 150° C. at atmospheric pressure and selected from the group consisting of alkylbenzenes and monohalogenated benzenes with sulfuric acid contained in a mixture of said type, while removing water from said mixture by joint vaporization with said compound, whereby a higher alkylbenzene sulfonic acid product is obtained which, in the sodium salt form, contains less than 1% by weight of salts insoluble in 90% ethyl alcohol.

2. In the process of producing a surface-active sulfonated product of the higher alkylbenzene sulfonate type by sulfonating a higher alkylbenzene with an excess of a sulfuric acid sulfonating agent, thereby forming a reacted sulfonation mixture containing a sulfonated higher alklybenzene and sulfuric acid, the improvement which comprises reacting a sulfonatable organic compound boiling below 150° C. at atmospheric pressure and selected from the group consisting of alkylbenzenes and monohalogenated benzenes with sulfuric acid contained in a mixture of said type, while removing water from said mixture by joint vaporization with said compound, and neutralizing the resulting mixture of sulfonic acids with an alkali metal hydroxide, whereby a higher alkylbenzene sulfonate product is obtained which is substantially completely soluble in 90% ethyl alcohol.

3. In the process of producing a surface-active sulfonated product of the higher alkylbenzene sulfonate type by sulfonating a higher alkylbenzene with an excess of a sulfuric acid sulfonating agent, thereby forming a reacted sulfonation mixture containing a higher alkylbenzene sulfonic acid and sulfuric acid, the improvement which comprises reacting an alkylbenzene boiling below 150° C. at atmospheric pressure with sulfuric acid contained in a mixture of said type, while removing water from said mixture by joint vaporization with said alkylbenzene, whereby a higher alkylbenzene sulfonic acid product is obtained which, in the sodium salt form, contains less than 1% by weight of salts insoluble in 90% ethyl alcohol.

4. The improved process set out in claim 3 in which the alkylbenzene is a methylbenzene.

5. In the process of producing a surface-active sulfonated product of the higher alkylbenzene sulfonate type by sulfonating a higher alkylbenzene with an excess of a sulfuric acid sulfonating agent, thereby forming a reacted mixture containing a higher alkylbenzene sulfonic acid and sulfuric acid, the improvement which comprises heating the sulfuric acid-containing reacted mixture with a sulfonatable organic compound boiling below 150° C. at atmospheric pressure and selected from the group consisting of alkylbenzenes and monohalogenated benzenes, while removing water by joint vaporization with said organic compound, and jointly recovering the resulting sulfonation product containing said higher alkylbenzene sulfonic acid and a sulfonic acid of the latter organic compound.

6. In the process of producing a surface-active sulfonated product of the higher alkylbenzene sulfonate type by sulfonating a higher alkylbenzene with an excess of a sulfuric acid sulfonating agent, thereby forming a reacted mixture containing a higher alkylbenzene sulfonic acid and sulfuric acid, the improvement which comprises heating the sulfuric acid-containing reacted mixture with an alkylbenzene boiling below 150° C. at atmospheric pressure, while removing water by joint vaporization with said organic compound, and jointly recovering the resulting sulfonation product containing said higher alkylbenzene sulfonic acid and a sulfonic acid of the latter organic compound.

7. In the process of producing a surface-active sulfonated product by sulfonating a higher alkylbenzene with a sulfuric acid sulfonating agent, thereby forming a reacted mixture containing a higher alkylbenzene sulfonic acid and sulfuric acid, the improvement which comprises heating the sulfuric acid-containing reacted mixture with a methylbenzene while removing water from the reaction mixture by joint vaporization with said methylbenzene, and jointly recovering the resulting sulfonation product containing said higher alkylbenzene sulfonic acid and a sulfonic acid of the methylbenzene.

8. In the process of producing a surface-active sulfonated product by sulfonating a higher alkylbenzene with a sulfuric acid sulfonating agent, thereby forming a reacted mixture containing a higher alkylbenzene sulfonic acid and sulfuric acid, the improvement which comprises heating the sulfuric acid-containing reacted mixture with toluene while removing water by joint vaporization with toluene, and jointly recovering the resulting mixture of sulfonic acids.

9. In the process of producing a surface-active sulfonated product by sulfonating a higher alkylbenzene with a sulfuric acid sulfonating agent, thereby forming a reacted mixture containing a higher alkylbenzene sulfonic acid and sulfuric acid, the improvement which comprises heating the sulfuric acid-containing reacted mixture with sufficient toluene to convert the spent sulfuric acid to toluene sulfonic acid and to remove water present and formed by the sulfonation of the toluene by joint vaporization with toluene, and jointly recovering the resulting mixture of sulfonic acids, whereby a surface-active sulfonated product is obtained which, in the sodium salt form, is substantially completely soluble in 90% ethyl alcohol.

References Cited in the file of this patent

UNITED STATES PATENTS

| | | |
|---|---|---|
| 2,820,015 | Smith | Jan. 14, 1958 |
| 2,820,056 | Gerhart et al. | Jan. 14, 1958 |